United States Patent [19]

Taylor

[11] 3,833,353

[45] Sept. 3, 1974

[54] PROCESS FOR CLASS VIIIB METALS ORE REDUCTION

[76] Inventor: Paul Franklin Taylor, P.O. Box 468, Crossville, Tenn. 38555

[22] Filed: Oct. 3, 1973

[21] Appl. No.: 403,261

Related U.S. Application Data

[63] Continuation-in-part of Ser. No. 273,284, July 19, 1972, abandoned.

[52] U.S. Cl............................ 75/21, 75/63, 75/83, 75/89, 252/61
[51] Int. Cl....................................................... C21b
[58] Field of Search............. 75/21, 63, 83, 89, 121, 75/26; 252/61; 423/23; 209/167

[56] References Cited
UNITED STATES PATENTS

| | | | |
|---|---|---|---|
| 1,425,186 | 8/1922 | Ellis | 252/61 |
| 2,914,380 | 11/1959 | Vickery | 423/23 |
| 2,950,818 | 8/1960 | Moeller | 252/61 |
| 3,037,627 | 6/1962 | Hazen | 209/167 |
| 3,047,361 | 7/1962 | Hubbard | 75/121 |
| 3,079,226 | 2/1963 | Newkirk | 75/121 |

*Primary Examiner*—Walter R. Satterfield

[57] ABSTRACT

The class VIIIB metals are generally found clustered and bound together within common ores, and most often include gold, silver, and copper. One such ore is of the Cobalt series comprised of the metals cobalt, nickel, silver, copper, and iron. Another one is of the Platinum series comprised of the metals platinum, nickel, copper, and iron. These are known respectively as Smaltite ore, and Pentlandite ore. Other platinum ore is found as alluvial deposits in regions of known noble metal-bearing formations such as the Ural Mountains, Colombia, and the Transvaal. They are sometimes referred to as "black sand" deposits and are mined by placer operations. This group includes platinum, palladium, rhodium, ruthenium, iridium, osmium, and usually with gold and silver. Much of it's noble metal may be recovered by such means as by washing with water to produce particles and nuggets. However, much of this ore as well as all other of the types above mentioned are so bound with oxygen and gange material chemically that such simple recovery methods are rendered ineffective, and indeed, oftentimes requires definite chemical reactions for their reductions. Such material is usually the resultant "tailing" product from hydraulic concentration and benefication processes. Consequently huge amounts of such material cannot be so simply processed, as by washing, for the economic recovery of the bound-up metals. The instant process operates for the reduction of the metals within all such ores. The process requires such material to be in finely divided form and concentrated for economic advantage. It is then admixed with a certain liquid formula solution within a suitable reduction container, followed by additions of finely divided limestone and stirred for homogeneous uniformity while chemical reactions go to completion. The liquid formula is comprised of phosphoric acid, zinc oxide, and an alkylphenol polyglycol ether type sulfated surfactant. The mixture within the container is then heated by endothermic heat sources until the ore has reacted fully chemically with the liquid formula solution. Gases are expelled until the ore reaches a dry, solid state. The reduced matrix material is then pulverized for convenient entry into a smelting medium, and there smelted to produce the metals as either ingot of individual metals or in matte-alloyed forms. The smelting amounts to only a melting out of the metals from the matrix material, such metals being already chemically reduced and released by the foregoing reaction with the reduction components under heating. The smelted metal forms into either type according to selective heat applications to the smelting medium as the operator may choose. The combination of reduction ingredients are effective, therefore, in liberating the metals from chemically-bound oxygen and gange impurities upon admixing with the ore, heating the mixture, and smelting the resulting residue matrix material to the metals.

3 Claims, No Drawings

PROCESS FOR CLASS VIIIB METALS ORE REDUCTION

This application is a continuation-in-part of co-pending application Ser. No. 273,284, filed July 19, 1972 and now abandoned.

The present invention relates to an improved method for separating the classes IB and VIIIB metals found in VIIIB ores from oxide impurities; more specifically known as reduction of the oxides in which the metals exist as chemically-bound components; such separating herein known as CLASS VIIIB METALS ORE REDUCTION.

As starting materials for this process powered or pulverized class VIIIB metal ore is admixed with a certain liquid formula solution. Powdered or pulverized calcium carbonate ($CaCO_3$) is added, and should be commercially pure of at least 99 percent.

The ore is; Smaltite ($CoAs_2(Ni,Fe,Cu,Ag)$); Pentlandite ($PtAs_2(Ni,Cu,Fe,)S$); the Platinum Series ore comprised of Pt,Pd,Rh,Ru,Ir,Os; and the Platinum Series ore containing the class IB metals, such ore comprised of Pt,Pd,Rh,Ru,Ir,Os,Au,Ag.

The liquid formula solution is of the following composition by weight ratio:

Phosphoric acid    24.20 number more or less
Zinc oxide    0.50 number more or less
Sulfated surfactant    1.00 number more or less The sulfated surfactant is a type of wetting agent and of composition alkylphenol polyglycol ether.

When the selected ore and other starting materials are admixed together within a reduction container and heated with endothermic heat oxygen and other oxide-gange impurities of the ore are released from the metals by chemical action and forms into chemical union with the liquid formula solution and calcium carbonate. The metals may then be melted (smelted) out of the resulting matrix material to either individual ingot or matte-like ingot according to selected and applied heat which the operator may choose.

It is, therefore, an object of the present invention process to provide another method for the production of classes IB and VIIIB metals.

It is another object to provide another method for reducing ore tailing stock from concentration and benefication operations for the production of classes IB and VIIIB metals.

It is still another object to provide a more simple and economical method for producing these metals from such chemically-bound ore.

Other objects and advantages will become apparent from a further reading of the description and the appended claims.

With the above and other objects in view the present invention mainly comprises a process for separating the classes IB and VIIIB metals from chemically-combined oxygen and other oxide-gange impurities, featuring ease of reduction operations, economic advantages by utilization of ore tailing stock otherwise considered of little or no value, and selective smelting as desired of the resulting matrix material.

The process begins with the admixing together of the starting materials, in a non-corroding, heat-resisting, and otherwise suitable pot or vat, followed by stirring until the chemical reaction is completed. The effect is in removing the chemically-bound oxygen from the metal into solution, also the gange impurities.

The pot or vat is then positioned within proper proximity of a suitable heating arrangement where effective heat may be applied to it.

The solution with the ore is then boiled with heat until sufficient liquid has chemically reacted with the ore with the release of some gases. The boiling is attended and enhanced by frequent stirrings with a non-corroding and otherwise suitable agitator. It is also attended by such mechanical arrangements as necessary for collecting and venting of flue gases.

The temperature operation range throughout the boiling period is that which is necessary for maintaining a gentle rolling boil. Heating is terminated when residue has baked to a dry and solid state.

The resulting residue matrix material may then be smelted, then refined by optional and conventional means as may be selected by the operator. However, class VIIIB metal is herein considered as produced by instant process with only the shown reduction method and subsequent melting out of the metals from the matrix by applied heat, as is similar in smelting.

OPERATIONAL EXAMPLE 1.

The operation utilizing instant process for class VIIIB metals ore reduction as derived from the foregoing specification may be exemplified more specifically and particularly by an explanation for the reduction of a volume of a weighed two ounce batch of the Platinum metals group ore (Ru,Rh,Pd,Os,Ir,Pt,Au,Ag) which the inventor has performed successfully. The ore is of the concentrated black sand tailings variety chemically bound by oxygen and gange material as before explained and described. Such ore is in finely divided form of approximate −100 to −325 mesh grade particulate size, and selected without consideration of ore concentration or metal percent.

The reduction equipment consists of the following: A stainless steel or heat-resisting pint crucible, or the equivalent in heat-resisting, non-corrosion properties and qualities; a heat-resisting, non-corrosion type stirring rod, and an appropriate gas-type or electric heating appliance.

Introduced within the crucible is the one volume of the Platinum metals group ore.

To the ore is added powdered limestone ($CaCO_3$) in finely divided form of approximately −100 to −325 mesh grade particulate size, such material being dry and of a commercially pure grade. Limestone may be added to the ore in any ratio between one-sixteenth volume and one-eighth volume. Ore and limestone is stirred to evenly distribute limestone throughout ore material.

To the mixture of ore and limestone is added about one volume of liquid chemical formula solution, such solution being comprised of ingredients as described in the above specification. The ore, limestone, and solution are thoroughly stirred and mixed until the visible chemical reaction has terminated.

With the crucible resting on the heating element, or appliance for producing heat, gentle heat is applied until boiling commences. The heat is then regulated so that a very gentle rolling boil continues. A vent is used for the outgassing fumes and gases. The boiling is continued until residue is thoroughly reduced and is baked to a dry and solid state. During boiling the mixture is stirred as often as necessary to maintain mixture homogeneity.

Upon termination of boiling the residue matrix material is allowed to cool and then removed and pulverized to acceptable size for entry into the smelting medium, where the metals are melted out.

The above example volume ratios present only a norm in the reduction of the Class VIIIB metal ores and is not intended to mean or be defined nor deduced that the reduction effectiviness for these metal series is necessarily confined to exact and definite ratios either by weight or by volume as different mesh sizes of both the ore and the limestone changes weights with volumes remaining constant. Neither can the liquid formula be confined to such ratio unrealities.

Boiling time periods for all various and possible batch sizes may only be determined by the operator depending upon his particular geographical location of operation; above example operations being performed at a geographical location of two thousand feet elevation above sea level, with atmospheric temperatures normally ranging between 20°F and 90°F. With respect to such factors as atmospheric temperatures, atmospheric pressures and altitudes, atmospheric humidity, fuels and heating oxidizers used (for reduction heating and smelting), vertical and lateral dimensions of reduction equipment used, etc., clear-cut and definite statements cannot be made herein as to the standard procedures in regard thereto for all various and possible batch sizes.

With regard to refining out the individual metals from the matt-like alloy produced by instant process; attention is drawn to conventionally established procedures in use for refining out like metals from the particles and nuggets of the Platinum series found as natural ores as cleansed by hydraulic placer operations; quote, *Smith's College Chemistry* by Ehret, seventh edition, page 790, "The six elements are all found together, hence the name platinum metals. They are alloyed in nuggets and particles which are separated from alluvial sand by washing. Platinum forms 60–84 percent of the whole. The chief deposits are in the Ural Mountains, Colombia, and the Transvaal. The separation of the native alloy into its components, which is accomplished by a complex series of chemical operations, is made difficult by the fact that all six metals have closely similar chemical properties."

Selective temperature smelting of the matrix produced by instant process will produce platinum series metals in alloys of only two to three at each heat, which greatly simplifies subsequent refining as above described.

The instant process is related to several of applicant's copending applications, which are; "Process for Class IVB Metals Ore Reduction," Ser. No. 117,098, "Process for Class IVB Metals Ore Reduction Improvement," Ser. No. 236,961, and "Process for Lanthanide and Actinide Metals Ore Reduction," Ser. No. 314,809. Attention is specifcally drawn to application Ser. No. 117,098, as chemical discussions presented within that application relate to like chemical cooperation of instant application, and is a factual representation of such chemical cooperation relative to all metals included in and claimed within instant application as well as to all others included and claimed within stated relative and supportive applications, and is intended for teaching of chemical-ore cooperation inherent in such processes.

What is claimed as new and desired to be secured by letters Patent is:

1. A method of reducing class VIIIB metal ore to individual ingot and matte-like alloyed forms comprised of any two or more of the metals iron, nickel, cobalt, copper, ruthenium, rhodium, palladium, osmium, iridium, platinum, silver, and gold, comprising the steps of:

a. Adding an amount between one-sixteenth and one-eighth volume of finely divided calcium carbonate (or limestone $CaCO_3$) to one volume of class VIIIB metal ore in finely divided form,
   b. stirring to evenly mix limestone and ore,
   c. adding a liquid chemical solution consisting essentially of about 24.2 parts by weight of phosphoric acid, about 0.5 parts by weight of zinc oxide, and about 1.0 part by weight of a sulfated surfactant,
   d. stirring to aid chemical reaction and maintain mixture homogeneity,
   e. bringing the mixture to a boil while stirring to vaporize the volatile materials until residue is baked to a dry, solid state, and
   f. heating residue sufficiently so as to melt out nickel, cobalt, copper, iron, ruthenium, rhodium, palladium, osmium, iridium, platinum, silver, and gold, in single and matte-like ingots.

2. The process of claim 1 wherein the class VIIIB metal ore is in the forms of; Smaltite ($CoAs_2(Ni,Fe,Cu,Ag)$), Pentlandite ($PtAs_2(Ni,Cu,Fe,)S$), Platinum series (Pt,Pd,Rh,Ru,Ir,Os), and Platinum series (Pt,Pd,Rh,Ru,Ir,Os,Au,Ag).

3. The process of claim 1 wherein the sulfated surfactant is an alkylphenol polyglycol ether.

* * * * *